No. 821,443. PATENTED MAY 22, 1906.
JOHN THOMPSON & JOSEPH THOMPSON.
COLLAR FOR PERSONAL WEAR.
APPLICATION FILED AUG. 9, 1905.

Witnesses:
P. F. Nagle.
C. S. McVay.

Inventors,
John Thompson,
Joseph Thompson,
By Friedersheim Hanbach
Attorneys.

UNITED STATES PATENT OFFICE.

JOHN THOMPSON AND JOSEPH THOMPSON, OF BELFAST, IRELAND.

COLLAR FOR PERSONAL WEAR.

No. 821,443.  Specification of Letters Patent.  Patented May 22, 1906.

Application filed August 9, 1905. Serial No. 273,436.

*To all whom it may concern:*

Be it known that we, JOHN THOMPSON and JOSEPH THOMPSON, cuff and collar manufacturers, subjects of the King of Great Britain, residing at 26 Little Victoria street, Belfast, Ireland, have invented an Improved Collar for Personal Wear, of which the following is a specification.

This invention relates to an improved collar for personal wear.

In order that our said invention may be properly understood, we have hereunto appended explanatory drawings, whereon—

Figure 1:
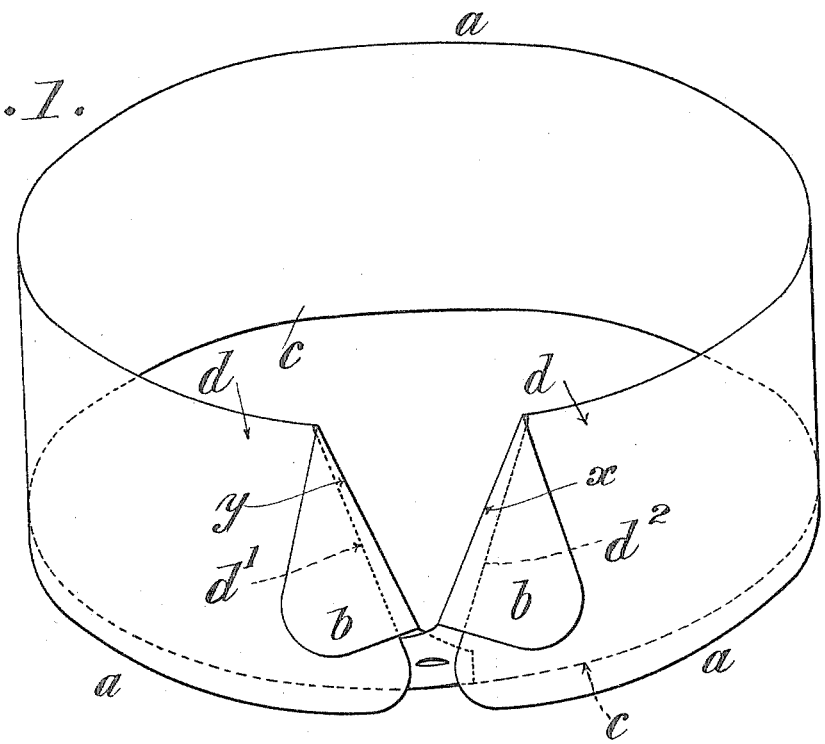
Figure 2:
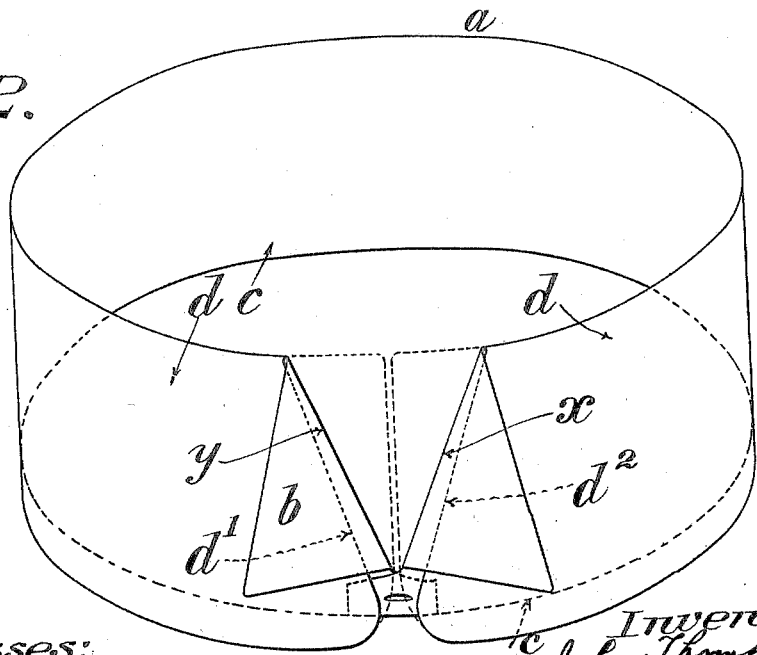

Figure 1 is a perspective view of the improved collar, while Fig. 2 is a similar view of the collar, but showing it as made with a different shape of front peak.

The double collar $a$ is of the vertical "double-decker" type now commonly worn; and the improvement consists in providing such collars with two peaks $b$ at the front. These peaks $b$, which are preferably of a triangular or somewhat triangular shape, are made one with the collar-band—*i. e.*, the inner band or fold $c$ of the collar $a$—so as to form extensions thereof, said extensions or peaks $b$ being turned outward, as shown, when dressed. The shape of the ordinary double-decker collar is indicated in dotted lines at Fig. 2, and, as will be seen, the new collar has the front ends of its band $c$ made with inclined folds at $x$ and $y$ and with projecting extensions which constitute the peaks $b\ b$. The front fold $d$ is cut away at an angle at $d'\ d^2$, so as to leave space for the peaks.

The peaks $b$ in place of being rounded or pointed, as shown, may be of any other desired shape.

The improved collar combines all the advantages of the ordinary vertical turn-over collar with those of the single upright collar provided with peaks. At the same time a neat and effective article of neckwear is produced.

Having now fully described our invention, what we claim, and desire to secure by Letters Patent, is—

A folded collar having in combination, a band having peaks deflected therefrom, an outer fold having beveled ends, said peaks being deflected over said ends.

In testimony whereof we affix our signatures in presence of two witnesses.

JOHN THOMPSON.
    JOSEPH THOMPSON.

Witnesses:
 M. M. JORDAN,
 W. A. HARRIS.